Jan. 30, 1951     G. C. ROBINSON     2,539,930

POWER-DRIVEN TOOL

Filed April 7, 1947

INVENTOR.
Girard C. Robinson
BY
Morsell & Morsell
ATTORNEYS

Patented Jan. 30, 1951

2,539,930

UNITED STATES PATENT OFFICE 2,539,930

POWER-DRIVEN TOOL

Girard C. Robinson, Maywood, Ill., assignor to Girard Manufacturing Products, Inc., Maywood, Ill., a corporation of Illinois Application April 7, 1947, Serial No. 739,916

6 Claims. (Cl. 192—30.5)

This invention relates to improvements in power driven tools.

In the use of power driven rotary tools for tightening nuts, bolts, or the like, or for operating drills, it is necessary to provide mechanism for preventing damage to the tool, motor, or operating parts when the nut or bolt is fully set or when resistance to turning is encountered. It is also desirable in the case of tightening a nut or bolt or the like that, when the nut or bolt is almost tight, extra power be provided to give the nut or bolt one or more final turning impacts.

Heretofore various mechanisms have been proposed for accomplishing the above purpose, including cooperating clutch members and springs wherein a relative longitudinal movement takes place between the clutch members when resistance is encountered due to foreshortening action produced by a wound up spring to cause the clutch to alternately disengage and engage. These devices are complicated and expensive, and because of the heavy springs which it is necessary to use and the arrangement of the clutch members, they are capable of being properly operated only by an air motor of relatively large horsepower, because at each impact, after a resistance is encountered, the motor stalls temporarily making it impractical to employ an electric motor because of the damage which results from the stalling.

In my prior Patents No. 2,256,496, issued September 23, 1941, and No. 2,347,125, issued April 18, 1944, tool operating units or adapters are disclosed which can be properly driven by a fractional horse power electric motor without damage to said motor, whereby garages or other institutions can readily use the unit to convert their drills into tighteners for nuts, bolts and the like.

The construction of the earlier patent includes the use of a single coil spring surrounding the driving spindle in which energy is stored by winding up the spring when resistance is encountered. This energy is utilized to cause reengagement with the driven member and to deliver a driving blow at the time of said re-engagement. This arrangement, however, precludes the use of the device for driving in a reverse direction unless the adapter is first taken apart and the coil spring reversed in position. In addition, with this prior construction, the degree of tightness desired, in tightening a nut for example, can be varied only by changing the size of the single coil spring.

In the second mentioned patent, several expansion springs which normally extend substantially longitudinally of the driving spindle are utilized, the springs being subjected to an elongating and twisting force when resistance to rotation of the tool is encountered. This arrangement permits the use of the tool or adapter for either direction of rotation without change. While these prior constructions accomplish their purpose satisfactorily, it has been found that the springs have only a limited life due to the excessive strains thereon. This is particularly true of the structure of Patent No. 2,347,125 wherein the twisting action has a tendency to fatigue the ends of the springs and cause them to break after a period of use. Furthermore, with this type of construction, if a spring does break, use of the tool cannot be continued until the spring is replaced.

It is a general object of the present invention to improve upon these prior constructions by providing a power driven tool wherein the life of the springs is substantially prolonged and wherein even if a spring should break, use of the tool can be continued until it is convenient to make a replacement.

A further object of the invention is to provide an improved power driven tool construction wherein the springs can be preloaded, if the tool is to be used for uni-directional drive, to conform to the degree of tightness desired. This preloading is accomplished in a simple manner by merely rotating a ring in one direction or the other, a short distance, and setting the ring in the selected position.

A further object of the invention is to provide a power driven tool which is easier to manufacture and assemble than prior constructions.

With the above and other objects in view, the invention consists of the improved power driven tool, and all its parts and combinations, as set forth in the claims, and all equivalents thereof.

In the accompanying drawing, illustrating one complete embodiment of the preferred form of the invention, in which the same reference numerals designate the same parts in all of the views.

Figure 1:
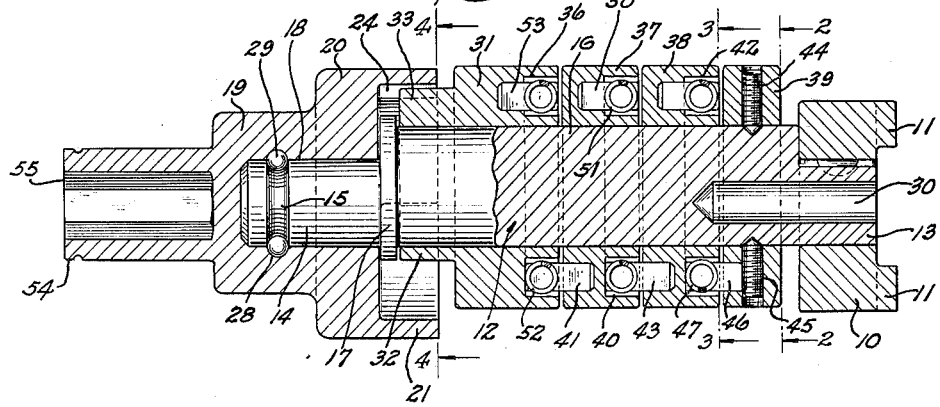
Fig. 1 is a longitudinal sectional view of the unit.

Referring more particularly to the drawing, the numeral 10 designates a driven clutch member which is formed with clutch teeth 11 for cooperation with cooperating clutch teeth (not shown) connected to any suitable source of power, such as an electric motor. The clutch member 10 is keyed or otherwise connected to one end 13 of a driving spindle 12 for the adapter. The end 13 is of relatively small diameter, as illustrated, and is short in length. At the opposite end is another aligned portion 14 of relatively small diameter which is preferably formed with a ball groove 15. Intermediate the portions 13 and 14 is an elongated eccentric part 16. Intermediate the eccentric part 16 and the end portion 14 is an integral annular shoulder 17.

The end 14 of the spindle constitutes a pilot which is rotatable within a bore 18 of a neck portion 19, there being a rotatable part 20 of enlarged diameter integral with said neck portion 19 and through which the bore 18 of the neck extends. The rotatable part 20 has an annular rim portion 21. Projecting inwardly from the rim portion 21 are opposed stops 22 and 23, the ends of which provide shoulders 24 and 25 and 26 and 27, respectively. While the use of two stops is preferred, for many uses one stop will suffice.

The pilot portion of the neck 19 may be formed with a groove 28 which cooperates with the groove 15 of the pilot 14 to receive ball bearings 29.

At the opposite end of the spindle and in axial alinement with the pilot 14, there may be a pilot opening 30.

Mounted loosely on the outer end of the eccentric is a ring 31 having its end of reduced diameter to form a rotatable driving member and provided with a radially projecting jaw 33 having engaging ends 34 and 35. The portion 32 of reduced diameter is positionable within the rim portion 21 of the member 20, and the jaw 33 is so located that its ends may co-act with the ends 24, 25, 26 and 27 of the stops 22 and 23.

The opposite end face of the ring 31 has a circular spring retaining groove 36. Positioned one adjacent the other on the eccentric 12 may be other rings 37 and 38, and between the ring 38 and the clutch member 10 is a driving and adjustment ring 39.

Figure 2:
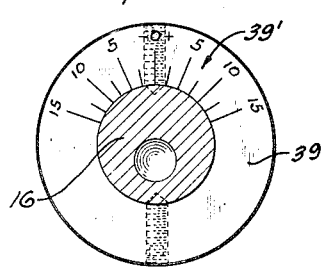
Fig. 2 is a sectional view taken on line 2—2 of Fig. 1.

The ring 37 has a circular spring retaining groove 40 in one of its end faces and has a lug 41 projecting from its opposite end face into the groove 36 of the member 31. The ring 38 is identical to the ring 37 and has a circular groove 42 in one end face and a lug 43 projecting from the opposite end face into the groove 40 of the ring 37. The connecting ring 39 has set screws 44 and 45 which connect it adjustably to the eccentric 16. The inner end face of the connecting ring 39 has a lug 46 which projects into the groove 42 of the ring 38. The opposite end face of the ring 39 may be formed with dial markings 39', as illustrated in Fig. 2.

It is, of course, possible to eliminate both of the rings 37 and 38 and have the lug 46 of the connecting ring directly engaged in the groove 36 of the member 31. However, for most purposes, a plurality of the rings, such as those designated by the numerals 37 and 38, are utilized.

The lug 46 engages between the movable ends of two coil springs 47 and 48. The opposite ends of said springs, where two are employed, engage a fixed lug 49 in the groove 42. If desired, more than two springs 47 and 48 may be employed to fill out the groove 42, or in certain instances, only a single spring may be used. However, it has been found preferable to utilize the two-section construction, as illustrated.

Figure 3:
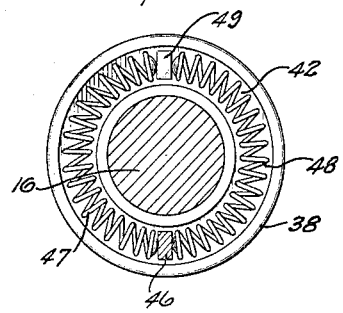
Fig. 3 is a sectional view taken on the line 3—3 of Fig. 1.

The lug 43, which projects from the opposite end face of the ring 38, engages in the groove 40 of the ring 37 and corresponds in all respects to the lug 46 of Fig. 3. The spring arrangement in the the groove 40 is identical to the spring arrangement illustrated in Fig. 3, and there may be a fixed lug 50 against which the ends of the springs 51 on each side seat, the lug 50 corresponding in all respects to the lug 49 of Fig. 3.

The lug 41, which projects from the opposite face of the ring 37, is positioned in the groove 36 in the same manner as the lug 46 is used in Fig. 3, and it engages between the movable ends of coil springs 52 within the groove 36. The springs 52 are arranged the same as the springs 47 and 48 of Fig. 3, and there is a fixed lug 53 projecting into the groove 36 and corresponding in structure and function to the fixed lug 49 of Fig. 3.

In use of the device, when the driving spindle portion 13 is driven in a clockwise direction, then because of the engagement between the jaw end 35 and the end 24 of the stop 22 (see Fig. 4), the rotatable part 20 and tool 54 will be rotated. The tool illustrated has a hexagonal opening 55 for cooperation with a nut, but other types of rotatable tools may be used. During normal driving conditions driving forces will be transmitted from the lug 46 of the connecting ring 39 through the spring 47, lug 49 and ring 38 to the lug 43 of the latter ring. The lug 43 in turn will act through one of the springs 51 in the ring 37 and lug 50 to drive the ring 37 and its lug 41. The latter will engage one of the springs 52, and, through the lug 53, will operate the ring 31 which carries the impact jaw 33.

When resistance to rotation is encountered, however, as when a nut is almost or fully set, then the eccentric 16 will start to rotate within the openings of the rings 31, 37 and 38. This will cause movement of the wide portion A of the eccentric from the position of Fig. 4 in a clockwise direction toward an opposite position and will cause the jaw 33 to be drawn radially inwardly along the shoulder 24. While this is occurring, the spring 47 and the springs 51 and 52 in the spring retaining grooves on one side of their respective rings will be compressed to store up energy. Upon continued rotation of the eccentric the jaw 33 will ultimately be pulled a sufficient distance radially inwardly to entirely clear the shoulder 24 of the stop 22. The energy stored in the compressed springs will then forcibly throw the jaw 33 into engagement with the end shoulder 26 of the stop 23. During such movement the weight of the jaw, augmented by the weight of the member 31, will deliver a driving impact to the shoulder 26 giving the nut which is being tightened an additional turning movement.

Figure 4:
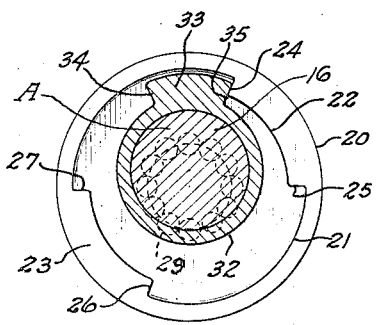
Fig. 4 is a sectional view taken on the line 4—4 of Fig. 1.
Figure 5:
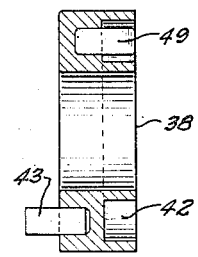
Fig. 5 is a cross-sectional view through one of the spring holding rings.

Following this impact the eccentric will act to disengage the jaw 33 from the shoulder 26 and the jaw will ultimately be thrown back into engagement with the shoulder 24, as in Fig. 4, delivering another driving impact. When the nut or bolt is fully set, if the tool is still held in engagement, the jaw 33 will continue to snap around from one shoulder to the other. If it is desired to operate the tool in a reverse direction from that just described, then the end 34 of the jaw 33 becomes the active end, and this end co-acts in cooperation with the shoulders 27 and 25. During such reverse operation energy is stored in the spring section 48 and in the spring sections of the other rings which correspond to the spring section 48.

Where only uni-directional rotation is desired, which is the case most of the time, energy may be prestored in the springs of the rings 31, 37 and 38 by making a proper adjustment of the ring 39. Referring to Fig. 3, if the tool is to be operated in a clockwise direction, by loosening the set screws 44 and 45 and rotating the disc 39 clockwise to a predetermined place on the dial 39', then the springs may be preloaded a predetermined amount to give a greater impact blow to the nut. By turning the disc 39' in a clockwise direction, it is possible to lighten the impact blow where this is desirable.

It is apparent that the construction is simple to manufacture and assemble and that any number of spring retaining rings may be readily employed depending upon requirements. By utilizing the multiple ring arrangement, even if one of the springs should break, the tool could still be used, with somewhat lessened efficiency, until it became convenient to make a replacement. However, due to the particular spring arrangement, wherein the springs are loaded by being compressed and wherein there are no twisting forces, the lives of the springs are increased materially over the lives of the springs employed in my prior patents before mentioned.

Various changes and modifications may be made without departing from the spirit of the invention, and all of such changes are contemplated as may come within the scope of the claims.

What I claim is:

1. In a power driven tool construction, a tool holder having a rotatable part formed with stop means spaced radially outwardly from the axis of rotation, a rotatable driving member having a circular opening therein and normally having a driving engagement with said stop means releasable by radial movement of said member out of engagement with said stop means, means including a driving spindle having an eccentric rotatable within said circular opening of said driving member for affecting said radial movement when said tool encounters a predetermined resistance to movement, a compression spring extending circumferentially around at least a portion of said eccentric, means on said eccentric engageable with one end of said spring to transmit a driving force thereto in a circumferential direction when the eccentric is rotated, and means for transmitting said driving force from the other end of said spring to said rotatable driving member, said spring being positioned to be compressed when resistance is encountered and to cause automatic reengagement of said rotatable driving member with said stop means after release, said eccentric driven means including an adjustment ring through which said eccentric extends and said adjustment ring being provided with a releasable setting member for connecting said ring in a predetermined position of rotation on said eccentric.

2. In a power driven tool construction, a tool holder having a rotatable part formed with stop means spaced radially outwardly from the axis of rotation, a rotatable driving member having a circular opening therein and normally having a driving engagement with said stop means releasable by radial movement of said member out of engagement with said stop means, means including a driving spindle having an eccentric rotatable within said circular opening of said driving member for affecting said radial movement when said tool encounters a predetermined resistance to movement, a compression spring extending circumferentially around at least a portion of said eccentric, a retaining ring for said spring within which said eccentric is rotatable, means on said eccentric engageable with one end of said spring to transmit a driving force thereto when the eccentric is rotated, and means including the retaining ring for transmitting said driving force from the other end of said spring to said rotatable driving member, said spring being positioned to be compressed in said retaining ring when resistance is encountered and to cause forcible automatic reengagement of said rotatable driving member with said stop means after release.

3. In a power driven tool construction, a tool holder having a rotatable part formed with stop means spaced radially outwardly from the axis of rotation, a rotatable driving member having a circular opening therein and normally having a driving engagement with said stop means releasable by radial movement of said member out of engagement with said stop means, means including a driving spindle having an eccentric rotatable within said circular opening of said driving member for affecting said radial movement when said tool encounters a predetermined resistance to movement, a retaining ring within which said eccentric is rotatable and having a circular grove, a lug in said groove, at least one compression spring in said groove having an end engaging said lug, and means driven by said eccentric and engageable with the opposite end of said spring to transmit a driving force thereto when the eccentric is rotated, there being a connection between said lug and said rotatable driving member for transmitting said driving force from said lug to said driving member, said spring being compressed against said lug when resistance is encountered and causing automatic reengagement of said rotatable driving member with said stop means after release, said eccentric driven means including an adjustment ring through which said eccentric extends and said adjustment ring being provided with a releasable setting member for connecting said ring in a predetermined position of rotation on said eccentric.

4. In a power driven tool construction, a tool holder having a rotatable part formed with stop means spaced radially outwardly from the axis of rotation, a rotatable driving member having a circular opening therein and normally having a driving engagement with said stop means releasable by radial movement of said member out of engagement with said stop means, means including a driving spindle having an eccentric rotatable within said circular opening of said driving member for affecting said radial movement when said tool encounters a predetermined resistance to movement, a retaining ring within which said eccentric is rotatable and having a circular grove, a first lug in said groove, a pair of springs in said groove having ends engaging opposite sides of said lug, an adjustment ring through which said eccentric extends, a lug projecting from said adjustment ring to a position between the other ends of said springs, a releasable setting member for connecting said adjustment ring in a selected position of rotation on said eccentric, there being a connection between said first lug and said rotatable driving member for transmitting a driving force thereto, one of said springs being compressible against said first lug when resistance is encountered and causing automatic reengagement of said rotatable driving member with said stop means after release.

5. In a power driven tool construction, a tool holder having a rotatable part formed with stop means spaced radially outwardly from the axis of rotation, a rotatable driving member having a circular opening therein and normally having a driving engagement with said stop means releasable by radial movement of said member out of engagement with said stop means, means including a driving spindle having an eccentric rotatable within said circular opening of said driving member for affecting said radial movement when said tool encounters a predetermined resistance to movement, the inner end of said rotatable driving member having a circular groove and constituting a first retaining ring, a fixed lug in said groove, a pair of springs in said groove having ends engaging opposite sides of said lug, said springs also having free ends adjacent each other, at least one additional retaining ring within which said eccentric is rotatable and having a circular groove in its inner end, a fixed lug in said groove, a lug projecting from the opposite end of said retaining ring and engaging between the free ends of the springs in said first retaining ring, a pair of springs in the groove of said additional retaining ring having ends engaging opposite sides of the lug in said groove, said springs having free ends adjacent each other, an adjustment ring through which said eccentric extends, a lug projecting from said adjustment ring and engaging between said free ends of the springs in said additional retaining ring, and a releasable setting member for connecting said adjustment ring in a selected position of rotation on said eccentric.

6. In a power driven tool construction, a tool holder having a rotatable part formed with stop means spaced radially outwardly from the axis of rotation, a rotatable driving member having a circular opening therein and normally having a driving engagement with said stop means releasable by radial movement of said member out of engagement with said stop means, means including a driving spindle having an eccentric rotatable within said circular opening of said driving member for affecting said radial movement when said tool encounters a predetermined resistance to movement, the inner end of said rotatable driving member having a circular groove and constituting a first retaining ring, a fixed lug in said groove, a spring in said groove having an end engaging said lug and having a free end, at least one additional retaining ring within which said eccentric is rotatable and having a circular groove in its inner end, a fixed lug in said groove, a lug projecting from the opposite end of said retaining ring and engaging said free end of the spring in said first retaining ring, a spring in the groove of said additional retaining ring having one of its ends engaging the lug in said groove and having a free end, and means on the driving spindle engageable with said free end of the last mentioned spring for transmitting power from the driving spindle thereto, said springs being compressed against the fixed lugs in their respective grooves when resistance is encountered and causing automatic reengagement of said rotatable driving member with said stop means after release.

GIRARD C. ROBINSON.

REFERENCES CITED

The following references are of record in the file of this patent:

UNITED STATES PATENTS

| Number | Name | Date |
|---|---|---|
| 1,952,564 | Prins | Mar. 27, 1934 |
| 1,956,798 | Janssen | May 1, 1934 |
| 2,196,589 | Jimerson | Apr. 9, 1940 |
| 2,256,496 | Robinson | Sept. 23, 1941 |
| 2,347,125 | Robinson | Apr. 18, 1944 |